Dec. 20, 1938.  G. W. DAVIDSON  2,140,899
GRAVITATION CONCENTRATION OF MINERAL VALUES, PARTICULARLY COAL
Filed Feb. 4, 1937
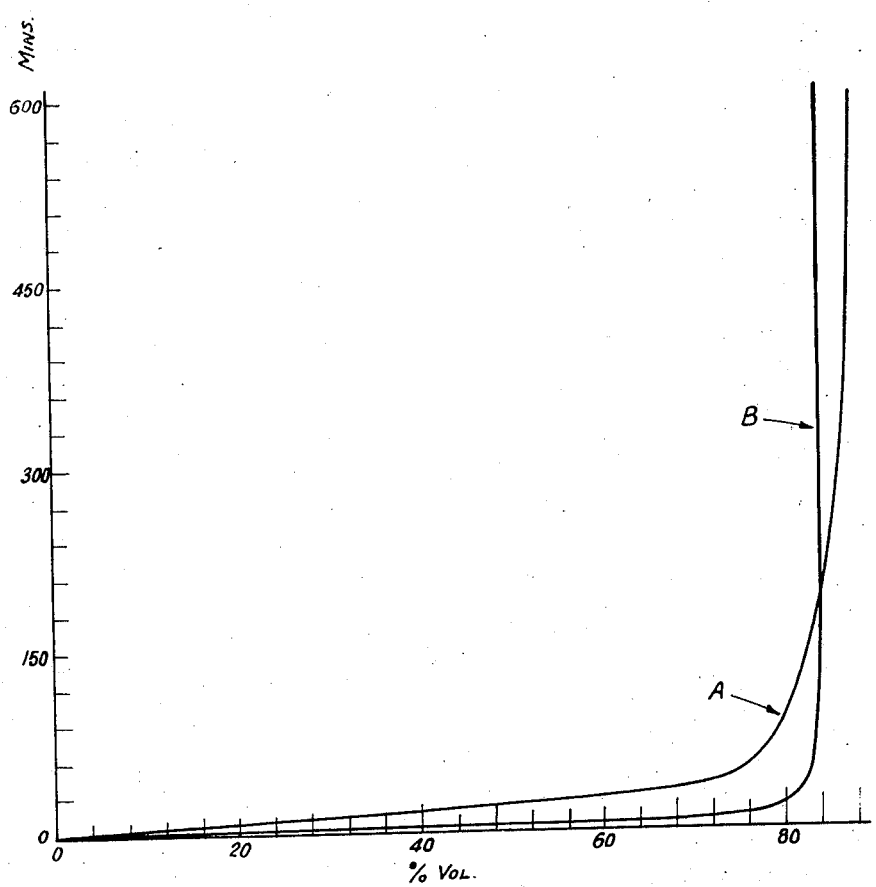
INVENTOR.
GEORGE WILLAM DAVIDSON,
Frank H. Borden
ATTORNEY.

Patented Dec. 20, 1938

2,140,899

UNITED STATES PATENT OFFICE 2,140,899

GRAVITATION CONCENTRATION OF MINERAL VALUES, PARTICULARLY COAL

George William Davidson, London, England

Application February 4, 1937, Serial No. 123,979
In Great Britain February 6, 1936

14 Claims. (Cl. 209—173)

It is known that a medium for the gravity concentration of values in mixtures which, like coal, consist of minerals of different specific gravity, can be made by dispersing or suspending in water a substance of such specific gravity and in such a proportion that the dispersion has a specific gravity higher or lower than that of the values and lower or higher than that of the material from which the values are to be separated.

Besides the specific gravity of the medium thus made, the viscosity and the stability of the medium must be considered.

A dispersion of the correct specific gravity and of sufficient stability is liable to be too viscous, so that the heavier constituent or constituents of the mineral mixture settle in the medium too slowly, and in many cases viscosity can be reduced only at the cost of stability.

An object of the present invention is to provide a stable medium for the gravity concentration of coal in which coal will float and shale and other impurities will be deposited.

A further object is to make a medium for the recovery of coal from shale by gravity concentration which is readily recoverable for continued use.

This invention is based on the observation that while the addition of a flocculating agent to a dispersion constituting a medium of the kind in question determines at first a comparatively rapid deposition of the dispersed particles, there can soon be attained a stage at which the flocculated particles remain in suspension for a longer period than they would had the flocculant not been added, and at the same time the viscosity of the medium is diminished without much diminution of the specific gravity.

The invention consists in preparing a medium by suspending or dispersing a suitable substance in water and adding a flocculating agent in such proportion that stabilizing of the medium after the addition of the flocculating agent is greater than its stability before such addition.

The proportion of flocculating agent required to produce the desired result varies with the nature of the dispersed matter and of the flocculating agent. The proportion can be ascertained for any given medium by plotting the weight of solid particles of the medium deposited against time in the medium without the added flocculating agent and in the medium to which the flocculating agent has been added. The curve produced in the latter case will be found to cross that produced in the former case when the proportion of the selected flocculating agent is correct.

The medium can be made from a number of ingredients among which are the substances pyrites and sulphides of iron and copper such as bornite and chalcocite, haematite and other iron oxides, galena, barytes, strontium sulphate and manganese dioxide, one or more of these substances being mixed with shale or a clay, kaolin, fuller's earth and talc. The medium is prepared by mixing a sludge of shale, clay or the like with one or more of the substances mentioned. The solid substances are ground finely and the degree of fineness is an important factor in the production of a successful medium according to the invention. The dilution of the aqueous heavy medium is also important as too high a percentage by weight of the solids to the water may result in the viscosity of the medium being too high. Suitable flocculating agents are those having a starch basis, for example that known under the registered trade-mark "Unifloc" and that known by the trade name "B.4". This substance B.4 has the following composition:

|  | Pounds |
|---|---|
| (a) Starch | 107 |
| Water | 102 |
| (b) Brine | 288 |
| (c) Water | 137 |
|  | 634 |

It is prepared by adding 107 lbs. starch to 102 lbs. of water and stirring till all lumps are broken up. The brine is then added quickly and the mixture stirred. Stirring is continued until the mixture has thickened and become free from grain and smooth when 136 lbs. of water are added and thorough mixture effected by again stirring. The brine used is prepared according to the following approximate formula:

|  | Pounds |
|---|---|
| Water | 352 |
| Calcium chloride | 412 |
| Magnesium chloride | 102 |
| Zinc chloride | 40 |
|  | 906 |

The starch must be of low acidity, and the calcium chloride and magnesium chloride must be free from all but traces of iron and aluminum.

The flocculating agent "Unifloc" consists of a gel which is made by subjecting a mixture of an amylaceous material (for example starch) and a neutral salt (for example zinc chloride) to heat and agitate until the cells of the amylaceous material bursts, forming a thick gummy paste. The process may be carried out at a temperature of from 50°–150° C. The paste is diluted before using. When B.4 is employed it will usually be found that the alkalinity of the medium will require adjustment until a pH value of between 8 and 11 is obtained.

The preparation and relative proportions of a medium according to the invention are illustrated by the following example of a medium suitable for the gravity concentration of coal from the shale contained in the coal. A mixture of shale pyrites and other impurities, having a specific gravity of about 3.4, which have been extracted from the coal is ground finely to minus 200 mesh and suspended by suitable agitation in water in such proportion that the suspension has a specific gravity between 1.2 and 1.8; a suitable value in practice has been found to be about 1.3. The proportion of flocculating agent, say that known under the trade name "B.4", found in the manner described above, is then added to the medium. The latter can now be used in known manner to remove shale from a run of mine coal by allowing the shale to sink in the medium while the floating coal is skimmed from the surface. It has been found advisable, in practice, to remove the finely powdered coal from the run of mine coal before introducing the latter to the medium for concentration as by such removal the medium can be cleaned less frequently.

An advantage of the invention resides in the ease with which the flocculated mineral particles can be washed from the concentrated coal as compared with the non-flocculated particles hitherto used, and the rapidity with which the diluted medium settles and thickens to the required concentration for recirculation in the system, at the same time giving clear water for use in the sprays.

Should it be found that, at the higher specific gravities, the dispersion medium becomes too viscous, the medium may be rendered more mobile while maintaining the specific gravity value substantially unchanged by adding a material such as silicate of soda.

The accompanying drawing shows an example of curves which indicate the correct proportion of flocculating agent for a mixture of clay and pyrites having a specific gravity (of the non-aqueous mixture of 3.3. The dry mixture was prepared by powdering so that 95 per cent. passed through 200 mesh. The powdered mixture was then mixed with water until the resultant slurry had a specific gravity of 1.4, the proportions then being 50 per cent. solids to 50 per cent. water by weight. In order to assist in the action of the flocculent sufficient lime was added to the dispersion until it reached a pH value of 9.5. By means of the curves in the accompanying drawing, in which the abscissa represents percentage volume of clarified liquid and the ordinate time in minutes, and in which curve A indicates the rate of deposition of the medium without the addition of flocculating agent and curve B the rate with such addition, the necessary quantity of the flocculating agent known by the trade name "B.4" was determined. The quantity in this case was 4.5 cc. of a concentration of 20 per cent. of the agent to 100 grammes of solids.

The curves shown were obtained by diluting the medium of specific gravity 1.4 until the solid content was 10 per cent. by weight and then plotting the curves for the medium plus different quantities of flocculating agent until the required curve B was produced, this, of course, being the curve which crossed the curve A.

It must be understood that the curves were prepared with a measured quantity taken from the dispersion prepared as described above. The amount of solids in the quantity or sample, before and after dilution thereof, are of course known, and it is assumed that before making the test these solids are uniformly distributed throughout the sample. Clearly, therefore, the quantity of liquid which, due to the action of the added flocculating agent, becomes clarified in the sample, can be taken as an indication of the rate of deposition of the quantity of solids therein and, in making the test, it was found convenient to measure the quantity of clarified liquid and plot the values found against time to make the curves.

The quantity or sample of the suspension taken for the purpose of plotting the curves was diluted in order that the action of the flocculating agent could be easily perceived. It will be understood that the curves show the amount of flocculating agent proper for the actual quantity of solids in the sample, and the actual amount added to the suspension, from which the sample was taken, is proportional to the quantity of solids in the suspension.

Having thus described the nature of the said invention and the best means I know of carrying the same into practical effect, I claim:

1. The preparation of a medium for the gravity concentration of values in mixtures of minerals of different specific gravities respectively above and below the specific gravity of the medium which comprises the steps of forming an aqueous dispersion of a finely comminuted dispersible substance, the substance being present in such quantity that the dispersion has a specific gravity between the respective specific gravities of the minerals to be separated, adding thereto a flocculating agent comprising salt-treated starch determined as herein described to produce an increase in the stability of the dispersion above that which it had before addition of the flocculating agent, adjusting the pH of the dispersion medium to a value between 8 and 11, and decreasing the viscosity of the dispersion by adding thereto silicate of soda.

2. A medium adapted for the gravity concentration of coal which is prepared by dispersing a mixture of pyrites and clay having a specific gravity of 3.3 and ground to about 200 mesh in an equal quantity by weight of water and adding 4.5 cc. per 200 grams of the dispersion of a 20 per cent concentration of the flocculating agent having a composition of starch, brine and water, the brine having a composition of calcium chloride, magnesium chloride, zinc chloride and water to the dispersion.

3. A medium adapted for the gravity concentration of coal which is prepared by dispersing a mixture of pyrites and clay having a specific gravity of 3.3 and ground to about 200 mesh in an equal quantity by weight of water, adding 4.5 cc. per 200 grams of the dispersion of a 20 per cent concentration of the flocculating agent having a composition of starch, brine and water, the brine having a composition of calcium chloride, magnesium chloride, zinc chloride and water to the dispersion and adjusting the alkalinity of the dispersion to a pH value of 9.5.

4. The preparation of a medium for the gravity concentration of values in mixtures of minerals of different specific gravities respectively above and below the specific gravity of the medium, which comprises the steps of forming an aqueous dispersion of a mixture of substances which includes an argillaceous substance, the substances being present in such quantity that the dispersion has a specific gravity between the respective specific gravities of the minerals to be separated, and adding thereto a flocculating agent consisting of salt-treated starch in such proportion that the initial deposition of the particles produced by the addition of said agent changes from a comparatively rapid rate to a rate lower than the normal deposition rate without such agent.

5. The preparation of a medium for the gravity concentration of values in mixtures of minerals of different specific gravities respectively above and below the specific gravity of the medium, which comprises the steps of forming an aqueous dispersion of a mixture of substances including an argillaceous substance, the substances being present in such quantity that the dispersion has a specific gravity between the respective specific gravities of the minerals to be separated, and adding thereto a flocculating agent consisting of salt-treated starch in such degree that deposition of the particles produced by the addition of the agent substantially ceases with retention of a greater quantity of the argillaceous material than in the absence of the agent.

6. The preparation of a medium for the gravity concentration of values in mixtures of minerals of different specific gravities respectively above and below the specific gravity of the medium, which comprises the steps of forming an aqueous dispersion of a mixture of substances which include an argillaceous substance, the substances being present in such quantity that the dispersion has a specific gravity between the respective specific gravities of the minerals to be separated, and adding thereto a flocculating agent consisting of salt-treated starch in such proportion that the stability of the dispersion is increased above that which it had before the addition of the flocculating agent.

7. The preparation of a medium for the gravity concentration of values in mixtures of minerals of different specific gravities respectively above and below the specific gravity of the medium, which comprises the steps of forming an aqueous dispersion of a mixture of substances which include an argillaceous substance, the substances being present in such quantity that the dispersion has a specific gravity between the respective specific gravities of the minerals to be separated, and adding thereto a flocculating agent consisting of salt-treated starch in such quantity that a substantially stable dispersion is obtained.

8. The preparation of a medium for the gravity concentration of values in mixtures of minerals of different specific gravities respectively above and below the specific gravity of the medium, which comprises the steps of forming an aqueous dispersion of a mixture of substances which include an argillaceous substance, the substances being present in such quantity that the dispersion has a specific gravity between the respective specific gravities of the minerals to be separated, and adding thereto a flocculating agent consisting of salt-treated starch in a proportion determined by adding the flocculating agent to a sample of the dispersion in an amount such that the initial rapid deposition of the particles produced by the addition of said agent is arrested, with retention of a greater quantity of argillaceous material than in the absence of such agent.

9. The preparation of a medium for the gravity concentration of values in mixtures of minerals of different specific gravities respectively above and below the specific gravity of the medium, which comprises the steps of forming an aqueous dispersion of a mixture of substances which include an argillaceous substance, the substances being present in such quantity that the dispersion has a specific gravity between the respective specific gravities of the minerals to be separated, and adding thereto a flocculating agent consisting of salt-treated starch in a proportion determined by adding the flocculating agent to a diluted sample of the dispersion in such amount that the initial rapid deposition of the particles produced by the addition of said agent is arrested, with retention of a greater quantity of clay than in the absence of the agent.

10. The preparation of a medium for the gravity concentration of values in mixtures of minerals of different specific gravities respectively above and below the specific gravity of the medium, which comprises the steps of forming an aqueous dispersion of a mixture of substances which include an argillaceous substance, the substances being present in such quantity that the dispersion has a specific gravity between the respective specific gravities of the minerals to be separated, and adding thereto a flocculating agent consisting of salt-treated starch in a proportion which gives a deposition-against-time curve of the medium which crosses that of a like medium without the flocculating agent.

11. The preparation of a medium for the gravity concentration of values in mixtures of minerals of different specific gravities respectively above and below the specific gravity of the medium, which comprises the steps of forming an aqueous dispersion of a mixture of substances which include an argillaceous substance, the substances being present in such quantity that the dispersion has a specific gravity between the respective specific gravities of the minerals to be separated, and adding thereto an amount of flocculating agent consisting of salt-treated starch which, reduced in amount in proportion to the weight of solids in a sample of the dispersion and added to such sample, gives a deposition-against-time curve of the sample which crosses that of a like sample without the flocculating agent.

12. The preparation of a medium for the gravity concentration of values in mixtures of minerals of different specific gravities respectively above and below the specific gravity of the medium, which consists in the steps of forming an aqueous dispersion of a mixture of substances which include an argillaceous substance, the substances being present in such quantity that the dispersion has a specific gravity between the respective specific gravities of the minerals to be separated, and adding thereto an amount of flocculating agent consisting of salt-treated starch which, reduced in amount in proportion to the weight of solids in a sample of the dispersion and added to such sample, gives a depositing-against-time curve of the sample which crosses that of a like sample without the flocculating agent.

13. The preparation of a medium for the gravity concentration of values in mixtures of minerals of different specific gravities respectively above and below the specific gravity of the medium, which comprises the steps of forming an aqueous dispersion of a mixture of substances which include an argillaceous substance, the substances being present in such quantity that the dispersion has a specific gravity between the respective specific gravities of the minerals to be separated, and adding thereto an amount of flocculating agent consisting of salt-treated starch which, reduced in amount in proportion to the weight of solids in a diluted sample of the dispersion and added to such sample, gives a deposition-against-time curve of the sample which crosses that of a like sample without the flocculating agent.

14. The preparation of a medium for the gravity concentration of values in mixtures of minerals of different specific gravities respectively above and below the specific gravity of the medium, which comprises the steps of forming an aqueous dispersion of a mixture of substances which include an argillaceous substance, the substances being present in such quantity that the dispersion has a specific gravity between the respective specific gravities of the minerals to be separated, and adding thereto a flocculating agent consisting of salt-treated starch in a proportion determined by taking samples of the dispersion, adding the flocculating agent to the samples in various proportions and determining which proportion gives a deposition-against-time curve of the sample which crosses that of a like sample without the flucculating agent.

GEORGE WILLIAM DAVIDSON.